United States Patent
Srikanth et al.

(10) Patent No.: US 8,214,748 B2
(45) Date of Patent: Jul. 3, 2012

(54) MEETING AGENDA MANAGEMENT

(75) Inventors: Hema Srikanth, Raleigh, NC (US); Gary Denner, Dublin (IE); Mette Friedel Margareta Hammer, Dublin (IE); Steve R. Murray, East Walpole, MA (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/564,327

(22) Filed: Sep. 22, 2009

(65) Prior Publication Data

US 2011/0072362 A1 Mar. 24, 2011

(51) Int. Cl.
*G06F 3/00* (2006.01)
*G06F 15/16* (2006.01)

(52) U.S. Cl. .................. 715/751; 715/753; 709/204
(58) Field of Classification Search .................. 715/751, 715/753; 709/204
See application file for complete search history.

(56) References Cited

U.S. PATENT DOCUMENTS

| | | | |
|---|---|---|---|
| 5,317,683 A | 5/1994 | Hager et al. | |
| 7,426,192 B2 * | 9/2008 | Amano et al. | 370/261 |
| 7,447,608 B1 | 11/2008 | Poston et al. | |
| 7,966,566 B2 * | 6/2011 | Ritter et al. | 715/753 |
| 2001/0034738 A1 | 10/2001 | Cantwell et al. | |
| 2004/0128179 A1 * | 7/2004 | Mashiko et al. | 705/8 |
| 2005/0050061 A1 | 3/2005 | Karstens | |
| 2006/0224430 A1 | 10/2006 | Butt | |
| 2007/0124682 A1 * | 5/2007 | Fukeda et al. | 715/730 |
| 2008/0040340 A1 | 2/2008 | Varadarajan et al. | |
| 2010/0318399 A1 * | 12/2010 | Li et al. | 705/9 |

* cited by examiner

*Primary Examiner* — Ting Lee
(74) *Attorney, Agent, or Firm* — Steven L. Nichols; Van Cott, Bagley, Cornwall & McCarthy P.C.

(57) ABSTRACT

A method for scheduling a meeting based on data collected from previous meetings includes: creating an agenda for a meeting with a computerized meeting management system, the agenda having at least one recurring agenda item; presenting a suggested amount of time for the at least one recurring agenda item to a user through the computerized meeting management system, the suggested amount of time being based on data regarding the recurring agenda item from at least one previous meeting.

18 Claims, 7 Drawing Sheets

MEETING AGENDA MANAGEMENT

BACKGROUND

Aspects of the present invention relate in general to meeting management solutions, and more particularly, to methods for creating a meeting agenda based on past meeting statistics. Meetings often play an integral role in how one allocates his or her time. For example, often a person with a busy work schedule would prefer not to spend more time than expected at a particular meeting when he or she has other urgent matters to attend to. Conversely, a person with a busy schedule may be frustrated if a meeting ends much earlier than intended, as that person could have scheduled other activities during the time allocated for the meeting. In addition, it is generally desirable that the meeting accomplish each of its scheduled items of business so as not to necessitate the scheduling of an additional meeting.

Nevertheless, planning and managing a meeting agenda can be difficult. Planning a meeting generally involves estimating the time required for each agenda item, and then calculating the total meeting time. Because a lot of factors may influence the amount of time actually needed for a particular item, it is often difficult to estimate a relatively accurate time allocation among all of the agenda items. If the time allocated to the various agenda items ends up being inconsistent with the actual times spent on them, the actual length of the meeting may end up being longer or shorter than the estimated and scheduled meeting length. In other scenarios, even if a meeting ends on time, it may be possible that too much time was spent on one agenda item while insufficient time was spent allotted to other items. Either of these scenarios may necessitate the scheduling of an additional meeting.

BRIEF SUMMARY

A method for scheduling a meeting based on data collected from previous meetings includes: creating an agenda for a meeting with a computerized meeting management system, the agenda having at least one recurring agenda item; presenting a suggested amount of time for the at least one recurring agenda item to a user through the computerized meeting management system, the suggested amount of time being based on data regarding the at least one recurring agenda item from at least one previous meeting.

A computerized meeting management system includes: at least one processor configured to execute meeting management software stored on a computer readable storage medium; the software being configured to cause the at least one processor to, upon execution of said software: maintain a record of at least one recurring meeting agenda item and data for the at least one recurring meeting agenda item from at least one previous meeting; and responsive to a user creating an agenda with the system for a meeting having the at least one recurring meeting agenda item, suggest an amount of time to schedule for the recurring meeting agenda item based on the data.

A computer program product for managing a meeting agenda includes: a computer readable storage medium having computer readable code embodied therewith being configured to: maintain a record of at least one recurring meeting agenda item and statistical data for the at least one recurring meeting agenda item; and responsive to a user creating an agenda with the system for a meeting having the at least one recurring meeting agenda item, suggest an amount of time to schedule for the recurring meeting agenda item based on the statistical data.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As mentioned above, planning a meeting generally involves estimating the time required for each item of business on the agenda. The total meeting time may then be estimated by the total amount of time estimated for each item of business on the agenda. Because a lot of factors may influence the amount of time needed for a particular item of business, it is often difficult to estimate a relatively accurate time. If the estimated time is not consistent with the actual time spent on various items of business, the actual length of the meeting may end up being longer than the estimated and scheduled meeting length. When this is the case, attendees may become frustrated as they may have other urgent matters to attend to. Conversely, if the actual length of the meeting ends up being shorter than the estimated and scheduled meeting length, attendees may become frustrated as they could have scheduled other events during that time. In addition, managing the agenda of a meeting presents certain challenges. If it is determined to hold to the estimated and scheduled meeting length, it may be possible that too much time is spent on one item of business while neglecting other needed items of business. Thus, even if the meeting ends at the scheduled time, certain items of business may have not been discussed, necessitating the scheduling of an additional meeting.

The present specification relates to a method for creating and managing a meeting agenda. According to one illustrative embodiment, a computerized meeting management system may allow a meeting participant to record the amount of time spent on various items of business throughout the meeting. The computerized meeting management system can form a set of statistical data about the amount of time spent on recurring items of business. When planning future meetings having these recurring items of business, the computerized meeting management system can present a suggested time to allocate for recurring items of business. This suggested time may be based on the statistical data acquired from previous meetings. A meeting scheduler may then plan the meeting based on the suggested times for the recurring items of business. When scheduling a meeting based on the statistical data from previous meetings, it is more likely that the actual meeting will hold to the scheduled agenda.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "agenda item" will refer to any item of business scheduled on a meeting agenda. The term "recurring agenda item" will refer to any item of business that is similar to a scheduled item of business of a previous meeting.

Throughout this specification and in the appended claims, the term "computerized meeting management system" refers to a system configured to record statistics of meetings and the agenda items of those meetings. These statistics may be used to help plan and manage future meetings. The computerized meeting management system may be further configured to provide additional functions relative to the management of a meeting.

Figure 1:
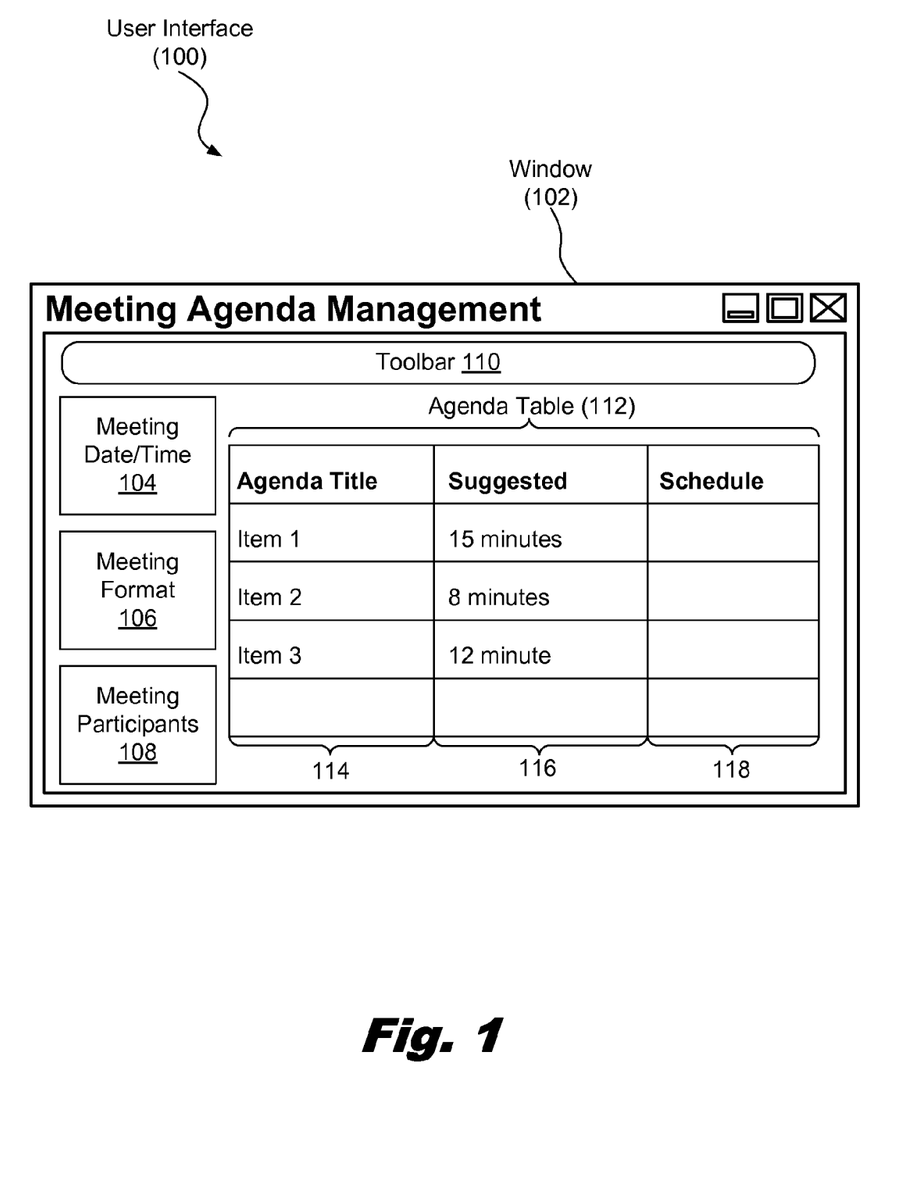
FIG. 1 is a diagram showing an illustrative user interface for scheduling the agenda for a meeting and having past meeting statistics available, according to one exemplary embodiment of principles described herein.

Referring now to the figures, FIG. 1 is a diagram showing an illustrative user interface (100) for scheduling the agenda for a meeting while having past meeting statistics available. According to one illustrative embodiment, a computerized meeting management system may include a user interface (100) allowing a user to plan a meeting. A user interface (100) may include a window (102) which will allow the user to interact with various features of the computerized meeting management system. These features may include, among others, meeting information such as date and time (104), meeting format (106) and intended meeting participants (106). The features included in the window may further include, an agenda table (112) having a column (114) for an assigned title of an agenda item, a column (116) for a suggested amount of time to allocate to the associated agenda item, and a data field column (118) allowing a user to schedule an amount of time for each agenda item. Features within the window may further include a toolbar (110). The toolbar may include a variety of features which may be standard for computer program applications.

Various pieces of information about past meetings and their recorded times can be useful when scheduling a meeting. For example, if the date and time (104) of meetings are recorded along with the time spent on those meetings, statistical data indicating how the date and time affects the average time of a meeting may be formed. It may be the case that meetings generally take longer in the morning. It may also be the case that meetings held on Monday generally take longer than meetings held on Friday.

The meeting format (106) may also affect the average amount of time needed to get through a meeting. Meetings may be held in a variety of formats. Some meetings are held in a room where all participants are present. Other meetings take place over videoconferences or teleconferences. It may be the case that a meeting with the same agenda items will generally take longer if done over a videoconference format than if done with all participants in the same MOM.

It may be possible that certain meeting participants (108) will affect the average amount of time it takes to complete a meeting. For example, some people tend to be long winded. Having a long winded individual as a participant in a meeting, may tend to increase the amount of time it takes to complete the meeting. Conversely, some people tend to push things along. Having a person who tends to push along the agenda may tend to decrease the amount of time it takes to complete a meeting.

By keeping track of certain information about a meeting including the date and time (104), the meeting format (106), and the meeting participants (108) as well as the time required to complete those meetings, statistical data can be formed to indicate a how these factors tend to affect how long it takes to complete a meeting. By having a computerized meeting management system maintain a record of the aforementioned information, this statistical data may be formed and updated regularly. A system or method embodying principles described herein is in no way limited to the recording of the above mentioned information. A variety of other factors which may influence the average amount of time spent on may be recorded as well.

The agenda of a meeting typically contains several items of business that need to be discussed. A window (102) in the user interface (100) could have an agenda table (112) in which a user could add agenda items to the meeting schedule. An agenda title column (114) could display the title of the added agenda items. Both new agenda items and recurring agenda items may be added to the schedule. An example of a recurring agenda item would be a weekly sales report or a daily progress report. By recording the amount of time spent on individual recurring agenda items as opposed to the entire meeting time, statistical data may be better targeted to certain aspects of a meeting. Because different meetings may include a mix of different recurring agenda items, having statistical data relative to each agenda item will help a user accurately plan for an upcoming meeting. Any of the data mentioned above with regard to an entire meeting may also be tracked for individual agenda items.

If an agenda item in the agenda item column (114) is recurring and has past statistics available, a suggested amount of time to allocate to the agenda item may be presented in another column (116). The suggested time could be based on the average amount of time spent on a particular agenda item under similar meeting conditions in the past. A column (118) may also be available for a user to enter the desired amount of time to schedule for each agenda item. A user may choose to follow the suggestion offered by the computerized meeting management system, but may also choose to schedule an alternate amount of time.

The window (102) of the user interface (100) may also include a toolbar (110). The toolbar (110) may contain a variety of features and operational functions associated with the computerized meeting management system. The toolbar may also allow users to access other aspects of the computerized meeting management system.

Figure 2:
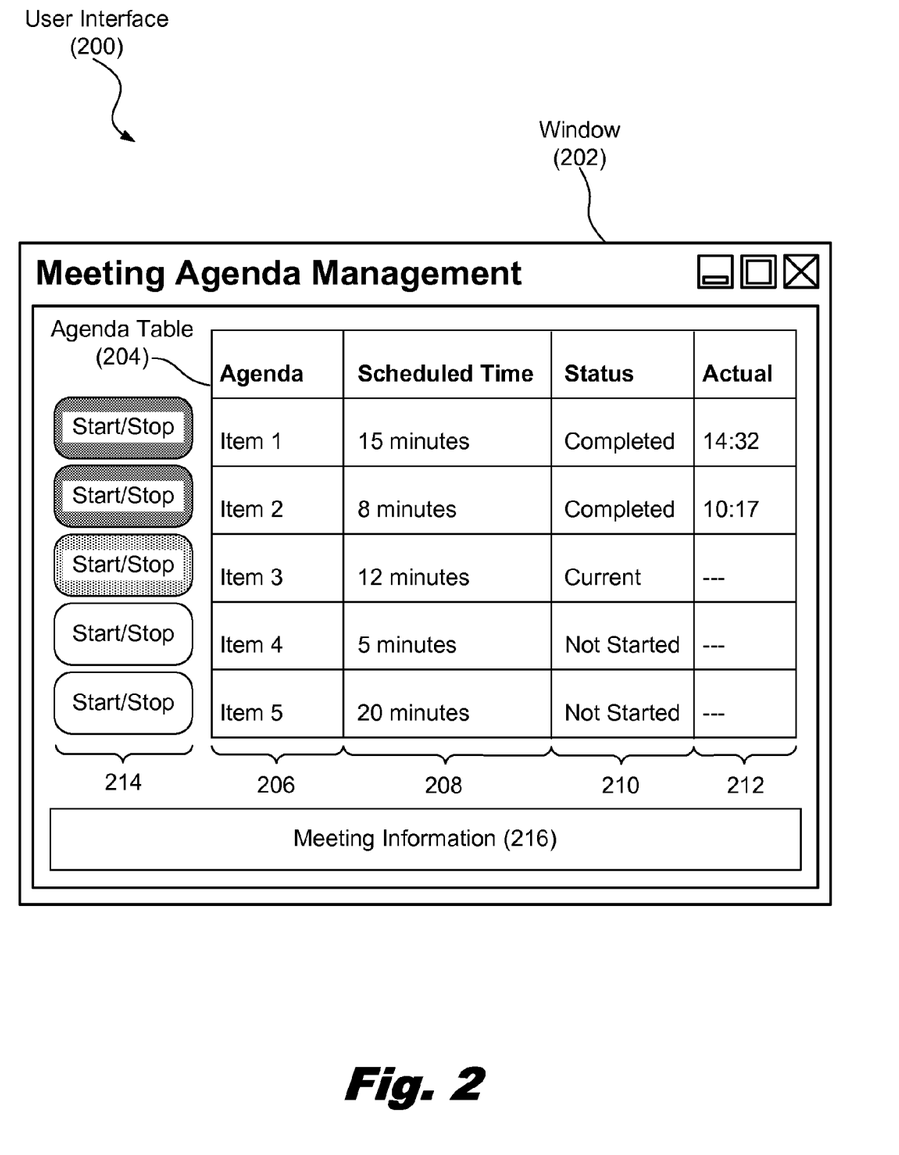
FIG. 2 is a diagram showing an illustrative user interface for recording the amount of time spent on agenda items within a meeting, according to one exemplary embodiment of principles described herein.

One other aspect of the computerized meeting management system is that of recording the amount of time spent in meetings and the time spent on each agenda item. FIG. 2 is a diagram showing an illustrative user interface (200) for recording the amount of time spent on agenda items within a meeting. According to one illustrative embodiment, the user interface (200) could contain a window (202) allowing the user to interact with various functions offered by the computerized meeting management system relating to recording the amount of time spent on each agenda item. The window may include an agenda table (204) having an agenda item column (206), a scheduled time column (208), a status column (210), and an actual time column (212). The window (202) may also include controls (214) allowing a user to indicate both start and stop times for each agenda item. Additional meeting information (216) may be displayed as well.

The user interface (200) illustrated in FIG. 2 may be used by a participant of a meeting during the actual meeting. The user interface (200) allows a user to keep track of the amount of time spent on each agenda item. Each agenda item may be displayed in the agenda table (204). The agenda table may have an agenda title column (206) displaying the title of each agenda item that has been scheduled for a meeting. The agenda table (204) may also include a scheduled time column (208) indicating the amount of time that the meeting planner has allocated for each agenda item. The agenda table (204) may further include a status column (210). The status column (210) may indicate which agenda items have already been completed, which one is currently being discussed, and which ones have not yet started. For every agenda item that has been completed, the actual amount of time spent on the completed agenda item may be displayed in an actual time column (212).

To indicate when the start and stop time for each agenda item of the meeting, the window (202) may include a set of controls (214). In one embodiment, the set of controls (214) could include a button for each agenda item. The button may be used to indicate both the start time and the stop time of a particular agenda item. The buttons may also be color coded. For example, one color could indicate completed agenda items, one color could indicate the current agenda item, and another color could be used to indicate agenda items which have not yet been started.

By keeping track of the amount of time spent on each agenda item and other meeting information, the statistics that are used to suggest an appropriate time to schedule for recurring agenda items may be updated after every meeting. By updating the statistics every meeting, the computerized meeting management system will be able to provide a more accurate suggested time to the meeting planner. The exact mathematical formulas used to determine how various factors will influence the average time of various recurring agenda items may be any of a variety of formulae. For example, some meeting planners may place greater weight on some statistics from previous meetings than on others. Those skilled in the relevant art will be able to develop appropriate statistical models for any particular application to provide a suggested time to a meeting planner.

Figure 3:
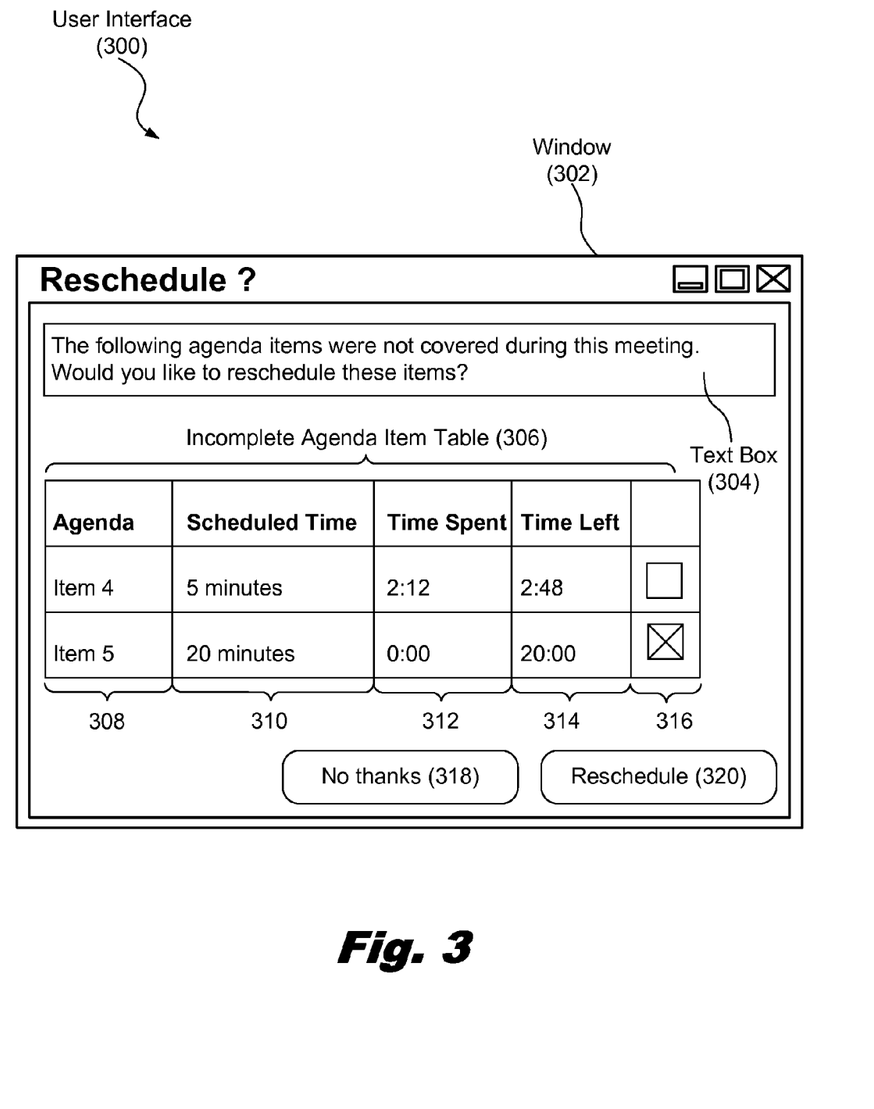
FIG. 3 is diagram showing an illustrative user interface for rescheduling incomplete agenda items from a meeting, according to one exemplary embodiment of principles described herein.

In addition to providing a suggested amount of time to schedule for recurring agenda items, the computerized meeting management system may also provide other functions to meeting participants. For example, the meeting management system may automatically reschedule agenda items that were not completed during a previous meeting. FIG. 3 is diagram showing an illustrative user interface (300) for rescheduling incomplete agenda items from a previous meeting. According to one illustrative embodiment, the computerized meeting management could cause a window (302) to appear if all of the agenda items scheduled for a meeting were not completed. The window (302) could include a text box (304) asking the user if they want to reschedule the incomplete agenda items. The window could also include an incomplete agenda item table (306) including an agenda item column (308), a scheduled time column (310), a time spent column (312), a time left column (314), and a checkbox column (316). The window (302) may also include controls (318, 320) allowing the user to interact with the user interface (300).

In some cases, a meeting will end right on schedule or prematurely because of an unexpected event whether or not all agenda items were covered. The incomplete agenda item table (306) may include a list of all of the agenda items that were not completed during the meeting's scheduled time. The agenda title column (308) may list all of the incomplete agenda items and any partially completed agenda items. The scheduled time column (310) could display how much time was originally scheduled for each incomplete agenda item. A time spent column (312) could display the amount of time that was spent on any partially complete agenda items. A time left column (314) could display how much time was allocated to an incomplete agenda item minus the amount of time spent on the incomplete agenda item. This may help the user determine if it is worthwhile to reschedule the agenda item. A checkbox column (316) may be used to allow a user to select which agenda items to reschedule. It may be the case that a user wishes to reschedule only some of the incomplete agenda items.

After a user has selected which incomplete agenda items to reschedule, the user may use various controls associated with the window (302) to indicate an action. For example, there could be a reschedule button (320) which, when activated, will automatically reschedule the incomplete agenda items selected in the checkbox column (316). There could also be a "no thanks" button (318) which, when activated, will close the window and not reschedule any of the incomplete agenda items.

Figure 4:
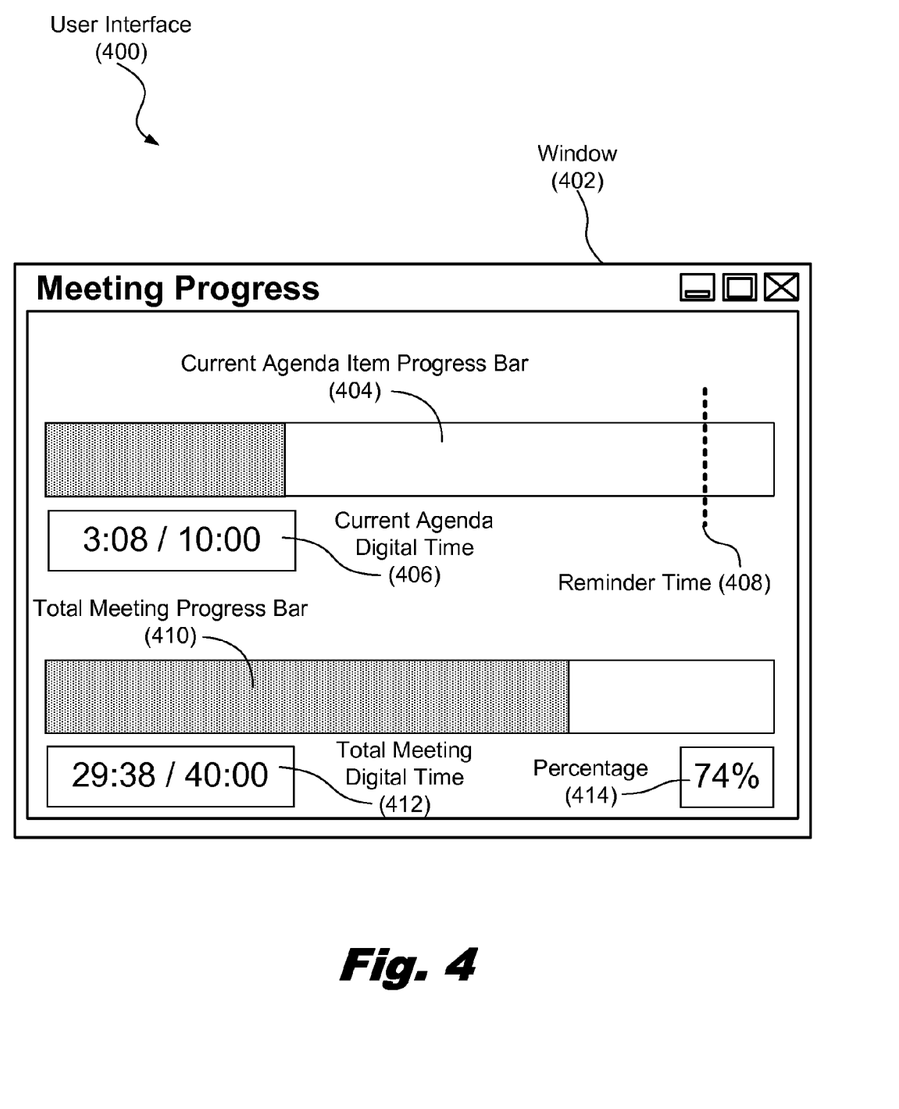
FIG. 4 is a diagram showing an illustrative user interface for displaying to a user the current progress of a meeting, according to one embodiment of principles described herein.

One function which may be provided by the computerized meeting management system is to display to a user, the progress of a meeting or agenda item. FIG. 4 is a diagram showing an illustrative user interface (400) for displaying to a user the current progress of a meeting. According to one illustrative embodiment, the user interface (400) may include a window (402). The window (402) may include both a current agenda item progress bar and a total meeting progress bar (410).

A current agenda item progress bar (404) may graphically display the amount of time spent on the current agenda item relative to the total amount of scheduled time. The amount of time spent on the current agenda item may also be displayed digitally in a current agenda digital time box (406). In one embodiment, the computerized meeting management system could be configured to notify a user that the time is approaching the end of the scheduled time for a particular agenda. This notification may take place through a variety of means including, but not limited to, a flashing light or a beeping sound. The current agenda item progress bar (404) could have a reminder line indicating when the reminder will be given.

A total meeting progress bar (410) may graphically display the progress of the entire meeting. The current meeting progress may also be displayed digitally by a total meeting digital time box (412). In one embodiment, the total meeting progress could also be displayed as a percentage (414). Having the progress of the meeting and its agenda items being graphically displayed may assist meeting participants in holding to the schedule of the meeting.

In one embodiment, the current agenda item progress bar (404) or the total meeting progress bar (410) may be color coded. For example, if the progress of the meeting is maintaining its original schedule, the progress bar (404, 410) may be green. If an agenda item or meeting has exceeded its allotted time, the progress bar (404, 410) may be red.

Figure 5:
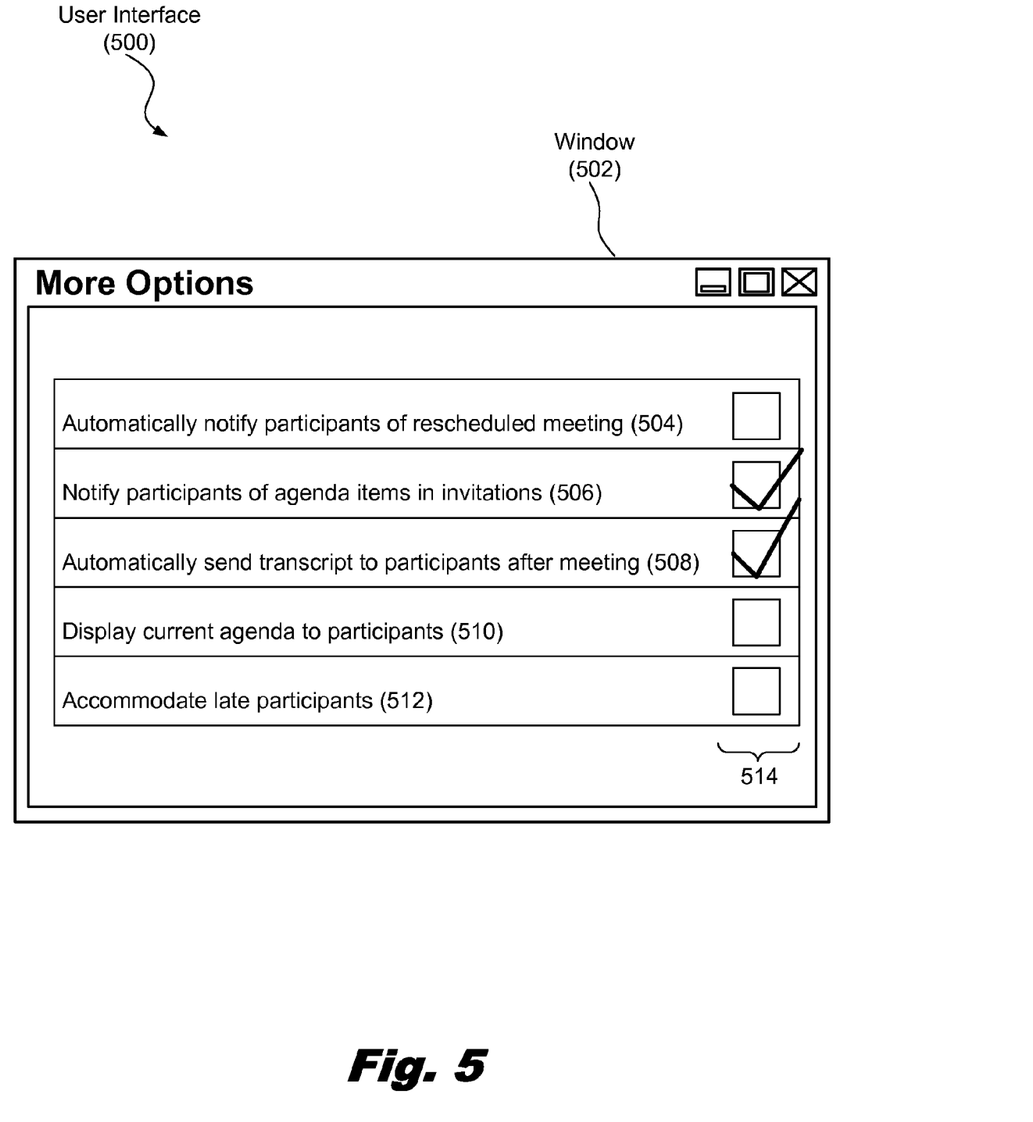
FIG. 5 is a diagram showing an illustrative user interface for applying additional features to meeting agenda items, according to one exemplary embodiment of principles described herein.

The computerized meeting management system may also include other functions to assist with the planning and management of a meeting. FIG. 5 is a diagram showing an illustrative user interface (500) for applying additional features to meeting agenda items. According to one illustrative embodiment, the user interface (500) may include an options window (502). The options window (502) may include a list of various features which may be selected through a checkbox (514) by a user. The features may include, among others, whether or not to automatically notify participants of a rescheduled meeting (504), notify participants of the agenda items on the schedule (506), send a transcript of the meeting to participants after the meeting (508), display the current agenda item to participants (510), and to accommodate late participants (512).

A user may have the option to automatically notify participants of an automatically rescheduled meeting (504) that results when agenda items are incomplete. As mentioned above, the identity of all participants in a meeting may be stored with a computerized meeting management system. If the option to notify participants of a rescheduled meeting is selected, an email, text or other message could be automatically sent to the participants indicating the date, time, and location of the rescheduled meeting.

A user may also have the option to notify participants of the agenda items (506) that will be discussed in an upcoming meeting. With this option selected, when a meeting coordinator sends out meeting invitations to meeting participants, the meeting invitation may list the agenda items which are scheduled for the meeting associated with the invitation.

A user may also have the option to automatically send a transcript to the meeting participants after the meeting (508). With this option selected, the participants may be emailed a transcript of the meeting sometime after the meeting has ended. The meeting may be recorded by a standard audio recording device. Either a digital audio file or a text copy transcribed from the digital audio file may be sent to the participants.

A user may also have the option to display the current agenda item being discussed during a meeting to participants (510). If the meeting is taking place in a room with the participants present, the current agenda item may be displayed on a projection screen. If the meeting is taking place over a communications network, the current agenda item may be displayed by a computer system used by participants.

A user may also have the option to accommodate participants who are late to the meeting (512). In one embodiment, when a late participant arrives, the computerized meeting management system could display to the late participant a list of all the past discussed agenda items as well as the current agenda item. If a scribe is summarizing and recording the points discussed for each agenda item, the computerized meeting management system may display to the late participant the summary of the past agenda items recorded by the scribe.

In one embodiment, statistical data recorded from a meeting agenda may be recorded from an offline terminal. An offline terminal may be any device not currently maintaining a data connection with the computerized meeting management system. When the terminal is online again, that is, a data connection is made, the statistical data recorded may be synched with the computerized meeting management system to bring the statistical data up to date. Any other changes or updates made from the offline terminal may also be synchronized when the terminal is online again.

The above described list of functions and operations used by the computerized meeting management system to assist with the planning and management of a meeting is not intended to be an exhaustive or complete list of functions available with a computerized meeting management system embodying principles described herein.

The above described user interfaces and windows are used to illustrate various functions and purposes associated with a computerized meeting management system. They in no way limit the practice of a computerized meeting management system embodying principles described herein.

Figure 6:
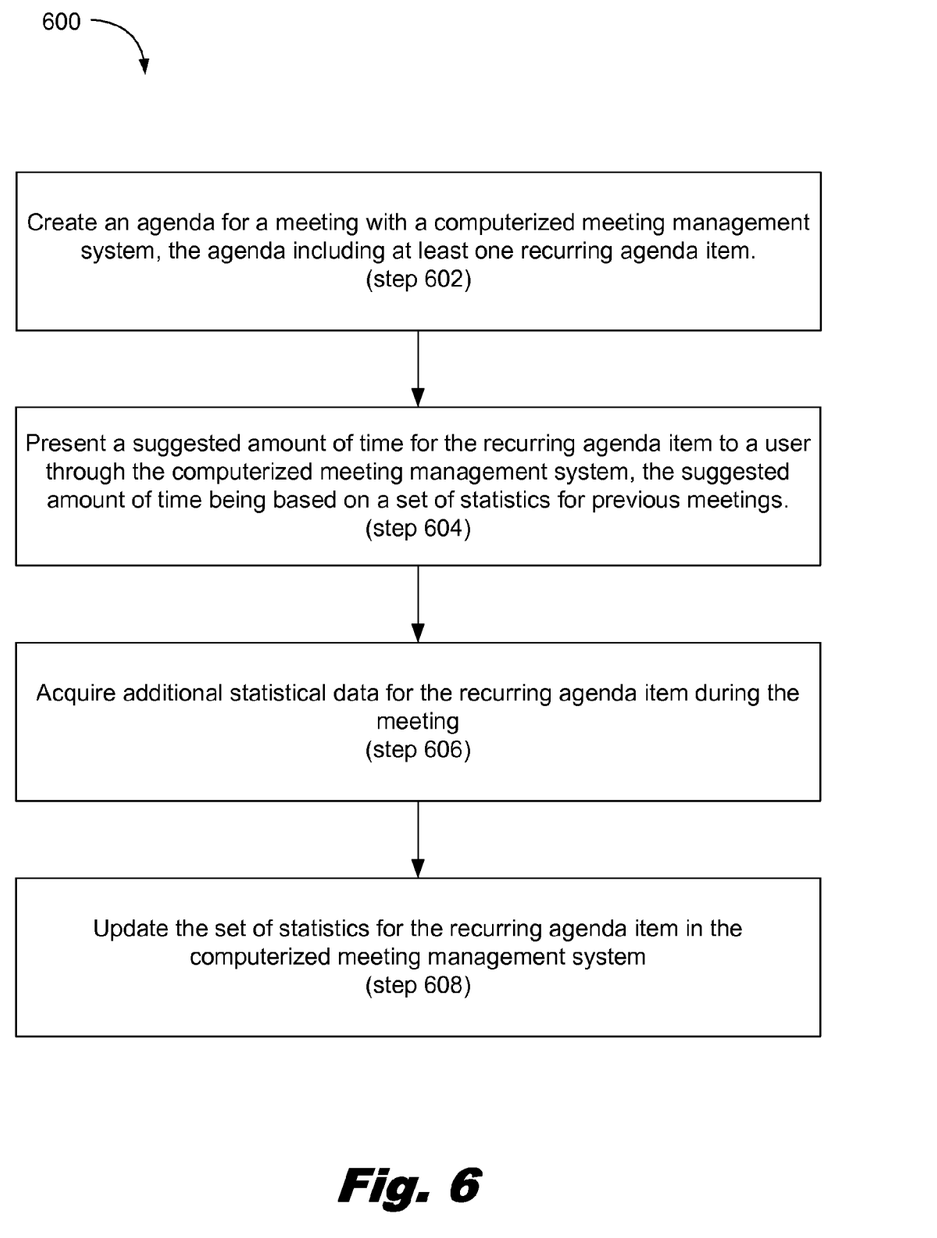
FIG. 6 is a flowchart showing an illustrative method for scheduling meeting agenda items based on past recorded meeting statistics, according to one exemplary embodiment of principles described herein.

FIG. 6 is a flowchart showing an illustrative method (600) for scheduling meeting agenda items based on recorded statistics from previous meetings. According to one illustrative embodiment, the method (600) may include the following steps. In the first step, an agenda is created (step 602) for a meeting with a computerized meeting management system. The meeting agenda will have at least one recurring agenda item. A suggested amount of time to allocate for the recurring agenda item may be presented (step 604) to a meeting planner by the computerized meeting management system. The suggested amount of time is based on statistics recorded for past occurrences of the recurring agenda item. During the meeting, additional statistical data may be acquired (step 606) for the recurring agenda items. The set of statistics for recurring agenda items used to suggest an amount of time to schedule for recurring agenda items may be updated (step 608) with the additional statistical data. The computerized meeting management system could be configured to perform the update.

Figure 7:
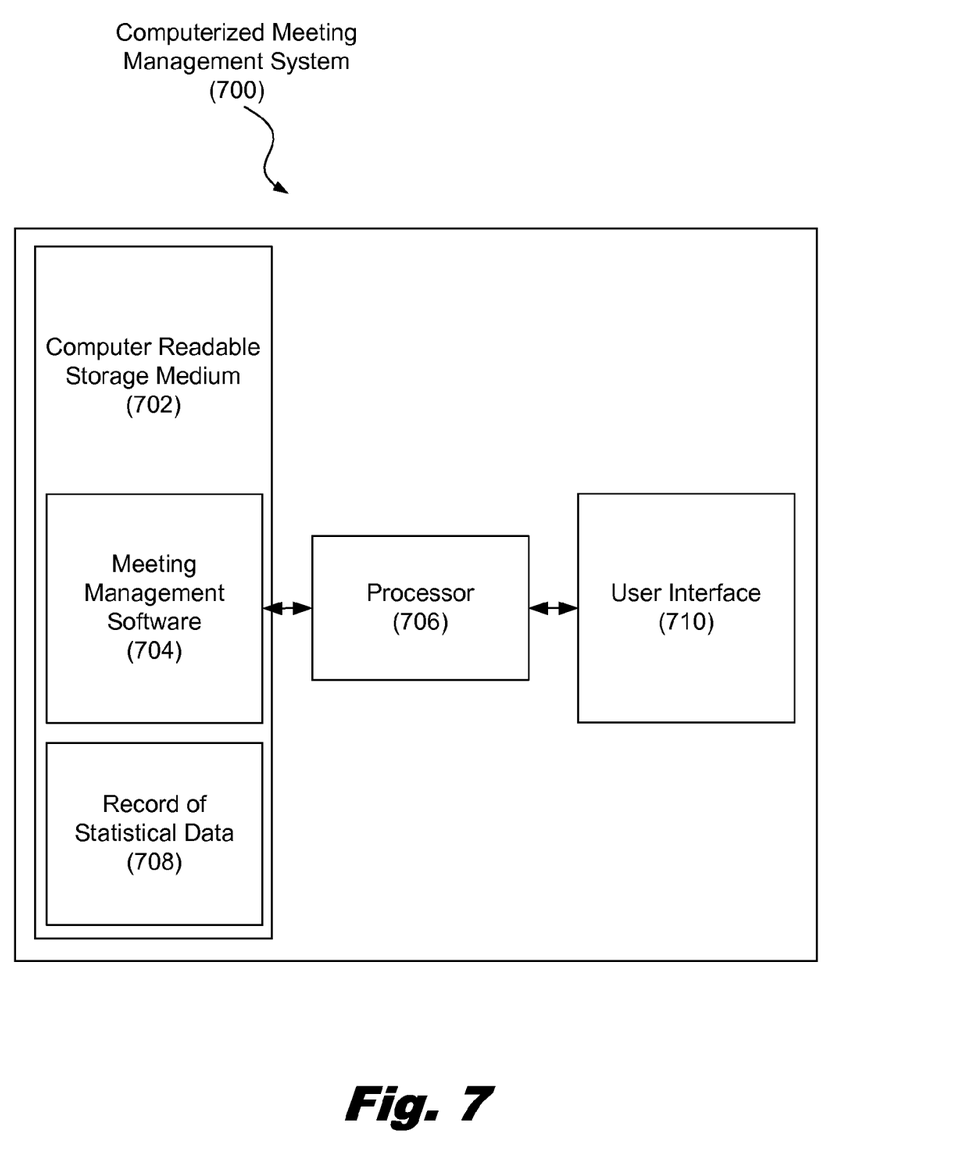
FIG. 7 is a diagram showing an illustrative computerized meeting agenda management system, according to one exemplary embodiment of principles described herein.

FIG. 7 is a diagram showing an illustrative computerized meeting agenda management system (700). According to one illustrative embodiment, the computerized meeting management system could include a processor (706), a user interface (710), and a computer readable storage medium (702) having stored thereon meeting management software (704) and a record of statistical data (708). The meeting management software (704) may be configured to instruct the processor to perform the functions described in the FIGS. 1 through 5. The record of statistical data (708) may be used to suggest an appropriate time to schedule agenda items of a meeting.

In some embodiments, the system (700) may be embodied as a server connected to a computer network, such as the Internet. In such an embodiment, the user interface (710) may include a connection via the network to user terminal, such as a laptop or other computer device, that is located where a meeting is taking place. Consequently, the user interface (710) may include the display and user input devices, e.g. a keyboard, mouse, track pad, etc., of that user terminal. In this way, all the feature of the interface described herein are available at the meeting location while the other components of the system (700) reside at a separate server location.

In sum, a computerized meeting management system allows a user to create the agenda for a meeting. If the meeting contains recurring agenda items, the computerized meeting management system may suggest an appropriate time to schedule for the recurring agenda item. The suggested time is based on a set of statistics obtained from data acquired by recording the amount of time spent on the recurring agenda item in past meetings. Additional factors that may influence the amount of time necessary to get through a recurring agenda item may also be included in the set of statistics. The computerized meeting management system also allows a user to record the amount of time spent on agenda items during a meeting. That data may then be used to update the set of statistics. Additional functions may also be used with the computerized meeting management system to help meeting participants manage their meetings.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for scheduling a meeting based on data collected from previous meetings, the method comprising:
   creating an agenda for a meeting with a computerized meeting management system, said agenda comprising at least one recurring agenda item;
   presenting a suggested amount of time for said at least one recurring agenda item to a user through said computerized meeting management system, said suggested amount of time being based on an average amount of time spent on said at least one recurring agenda item in previous meetings that have meeting conditions matching those of said meeting, wherein the average amount of time is determined based on statistical data correlating time spent on said at least one recurring agenda item in said previous meetings that have meeting conditions matching those of said meeting.

2. The method of claim 1, further comprising:
   acquiring additional data for said at least one recurring agenda item during another meeting; and
   updating said data for said at least one recurring agenda item in said computerized meeting management system with said additional data.

3. The method of claim 1, in which said average amount of time averages only previous meetings with conditions that match those of said meeting, said conditions comprising at least one of: a date and time of said meeting, a location of said meeting, and participants of said meeting.

4. The method of claim 1, further comprising automatically notifying at least one meeting invitee of said at least one recurring agenda item for said meeting in an invitation for said meeting with said computerized meeting management system.

5. The method of claim 1, further comprising automatically providing a notification with said computerized meeting management system when said at least one recurring agenda item is approaching an end of a scheduled amount of time for that agenda item.

6. The method of claim 1, further comprising, responsive to a determination that said at least one recurring agenda item has not been completed, automatically scheduling a subsequent meeting for said at least one recurring agenda item with said computerized meeting management system.

7. The method of claim 6, further comprising automatically sending an invitation with said computerized meeting management system to at least one participant for said subsequent meeting.

8. The method of claim 1, further comprising:
   recording data regarding said meeting with a terminal that is not in communication with said computerized meeting management system; and
   providing said data to said computerized meeting management system when said terminal is in communication with said computerized meeting management system.

9. The method of claim 1, further comprising displaying a progress indicator with said computerized meeting management system indicating an elapsed time of said at least one recurring agenda item of said meeting relative to a scheduled time for said at least one recurring agenda item.

10. The method of claim 1, further comprising displaying with said computerized meeting management system a current agenda item of said meeting to at least one participant.

11. The method of claim 1, further comprising displaying a current agenda item and past agenda items in said agenda with said computerized meeting management system to a late participant to said meeting.

12. A computerized meeting management system, the system comprising:
   at least one processor configured to execute meeting management software stored on a computer readable storage medium;
   said software being configured to cause said at least one processor to, upon execution of said software:
   maintain a record of at least one recurring meeting agenda item and statistical data correlating time spent on said recurring meeting agenda item from previous meetings that have meeting conditions matching those of said meeting, wherein said statistical data is used to determine an average amount of time spent on said at least one recurring agenda item in said previous meetings that have meeting conditions matching those of said meetings; and
   responsive to a user creating an agenda with said system for a meeting comprising said at least one recurring meeting agenda item, suggesting an amount of time to schedule for said recurring meeting agenda item based on said average amount of time.

13. The system of claim 12, in which said average time averages only previous meetings with meeting conditions that match those of said meeting, said meeting conditions comprising at least one of: a date and time of said meeting, a location of said meeting, and participants of said meeting.

14. The system of claim 12, in which said system is configured to update said data based on additional data acquired during another meeting.

15. The system of claim 12, in which said system is configured to display to a participant of said meeting a progress indicator that indicates an elapsed time of said at least one recurring agenda item of said meeting relative to a scheduled time for said at least one recurring agenda item.

16. The system of claim 12, in which said system is configured to notify a participant of said meeting when said at least one recurring agenda item is approaching an end of a scheduled amount of time.

17. A computer program product for managing a meeting agenda, the computer program product comprising:
   a computer readable storage medium having computer readable code embodied therewith, the computer readable program code comprising:
   computer readable program code configured to:
   maintain a record of at least one recurring meeting agenda item and statistical data correlating time spent on said at least one recurring meeting agenda item in previous meetings that have meeting conditions matching those of said meeting, wherein said statistical data is used to determine an average amount of time spent on said at least one recurring agenda item in said previous meetings that have meeting conditions matching those of said meeting; and
   responsive to a user creating an agenda with said system for a meeting comprising said at least one recurring meeting agenda item, suggest an amount of time to schedule for said recurring meeting agenda item based on said average amount of time.

18. The computer program product of claim 17, in which said computer readable program code is configured to update said data based on additional data acquired during another meeting.

* * * * *